(12) United States Patent
Sute

(10) Patent No.: US 10,051,435 B2
(45) Date of Patent: Aug. 14, 2018

(54) MOBILE DEVICE LOCATION SYSTEM

(71) Applicant: DENSO International America, Inc.

(72) Inventor: Steven Sute, Dearborn, MI (US)

(73) Assignees: DENSO International America, Inc., Southfield, MI (US); DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/467,482

(22) Filed: Mar. 23, 2017

(65) Prior Publication Data

US 2018/0167784 A1 Jun. 14, 2018

Related U.S. Application Data

(60) Provisional application No. 62/433,037, filed on Dec. 12, 2016.

(51) Int. Cl.
| | |
|---|---|
| *H04W 4/00* | (2018.01) |
| *H04W 40/00* | (2009.01) |
| *B60W 10/30* | (2006.01) |
| *H04W 4/04* | (2009.01) |
| *H04W 4/80* | (2018.01) |

(52) U.S. Cl.
CPC ........... *H04W 4/046* (2013.01); *H04W 4/008* (2013.01); *H04W 4/80* (2018.02)

(58) Field of Classification Search
CPC ..... H04W 4/046; H04W 4/008; H04W 4/023; H04W 4/80; H04W 64/006; H04W 88/02; B60W 10/08; B60W 10/30; B60W 2600/00; B60W 50/00; H04B 17/27; H04B 17/318; H04B 5/0031; H04B 5/0056; H04B 5/0062; H04B 7/00; H04B 7/0608

USPC .......................................... 455/456.1–456.6
See application file for complete search history.

(56) References Cited

U.S. PATENT DOCUMENTS

| | | |
|---|---|---|
| 9,086,948 B1 | 7/2015 | Slusar et al. |
| 2003/0003865 A1 | 1/2003 | Defosse et al. |
| 2005/0249139 A1 | 11/2005 | Nesbit |
| 2006/0066597 A1 | 3/2006 | Sampsell |
| 2006/0077150 A1 | 4/2006 | Sampsell |
| 2006/0077507 A1 | 4/2006 | Chui et al. |

(Continued)

FOREIGN PATENT DOCUMENTS

| | | |
|---|---|---|
| DE | 10152855 A1 | 5/2003 |
| DE | 102009038150 A1 | 3/2011 |

(Continued)

*Primary Examiner* — Nathan Taylor
(74) *Attorney, Agent, or Firm* — Harness, Dickey & Pierce, P.L.C.

(57) ABSTRACT

A system for identifying location of a mobile electronic device relative to an object. The system includes an electronic control unit configured to calculate location of the mobile electronic device, the electronic control unit including a first transceiver connected to a first antenna that receives signals from the mobile electronic device used by the electronic control unit to identify location of the mobile electronic device. One or more antenna modules are in communication with the electronic control unit. Each one of the antenna modules includes a second transceiver connected to at least two secondary antennas that receive signals from the mobile electronic device used by the electronic control unit to identify location of the mobile electronic device.

19 Claims, 2 Drawing Sheets

(56) References Cited

U.S. PATENT DOCUMENTS

Figure 1:
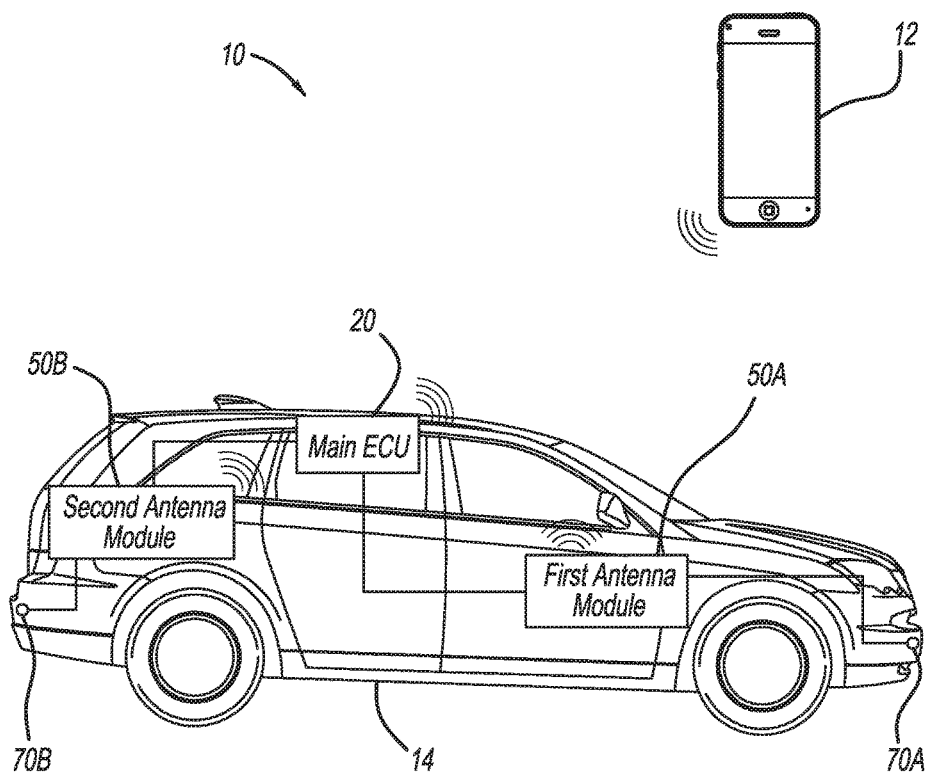

| | | |
|---|---|---|
| 2006/0077533 A1 | 4/2006 | Miles et al. |
| 2006/0114100 A1* | 6/2006 | Ghabra .................. E05B 81/78 340/5.61 |
| 2006/0129691 A1 | 6/2006 | Coffee et al. |
| 2006/0255908 A1* | 11/2006 | Gilbert .................... B60R 25/24 340/5.61 |
| 2006/0270465 A1 | 11/2006 | Lee et al. |
| 2007/0197261 A1 | 8/2007 | Humbel |
| 2007/0279304 A1* | 12/2007 | Chakam ................. H01Q 1/088 343/713 |
| 2008/0268838 A1 | 10/2008 | Zufall et al. |
| 2008/0318622 A1 | 12/2008 | Jen |
| 2009/0112394 A1 | 4/2009 | Lepejian et al. |
| 2010/0019924 A1 | 1/2010 | D'Alessandro et al. |
| 2010/0305779 A1* | 12/2010 | Hassan .................. G01C 17/38 701/2 |
| 2010/0317337 A1* | 12/2010 | Chakam ............... H01Q 1/3241 455/422.1 |
| 2011/0012661 A1 | 1/2011 | Binder |
| 2011/0254660 A1* | 10/2011 | Sun ..................... B60C 23/0418 340/5.61 |
| 2012/0032876 A1 | 2/2012 | Tabe |
| 2013/0201316 A1 | 8/2013 | Binder et al. |
| 2014/0058586 A1* | 2/2014 | Kalhous .................. B60R 25/24 701/2 |
| 2014/0188309 A1* | 7/2014 | Caratto .................... B60R 25/00 701/2 |
| 2014/0188348 A1* | 7/2014 | Gautama ............... B60W 10/30 701/48 |
| 2014/0192480 A1 | 7/2014 | Winkler et al. |
| 2015/0028995 A1* | 1/2015 | Gautama ............... B60R 25/406 340/5.72 |
| 2015/0123854 A1 | 5/2015 | Chakam et al. |
| 2015/0181392 A1 | 6/2015 | Lee |
| 2015/0192423 A1* | 7/2015 | Van Wiemeersch ... G01C 21/36 701/2 |
| 2015/0208207 A1 | 7/2015 | Ye et al. |
| 2016/0320469 A1* | 11/2016 | Laifenfeld ............ G01S 5/0284 |
| 2017/0092104 A1* | 3/2017 | Wehner .................. G08B 21/24 |
| 2017/0105101 A1* | 4/2017 | Santavicca ............ H04W 4/046 |
| 2017/0249417 A1* | 8/2017 | Gosieski, Jr. ............ G06F 3/011 |

FOREIGN PATENT DOCUMENTS

| | | |
|---|---|---|
| IN | 00549MU2010 | 7/2010 |
| WO | WO-09013252 A1 | 1/2009 |
| WO | WO-16174659 A1 | 11/2016 |

* cited by examiner

MOBILE DEVICE LOCATION SYSTEM

CROSS-REFERENCE TO RELATED APPLICATIONS

This application claims the benefit of U.S. Provisional Application No. 62/433,037, filed on Dec. 12, 2016. The entire disclosure of the above application is incorporated herein by reference.

FIELD

The present disclosure relates to a mobile device location system, such as a mobile device location and authentication system for determining where a mobile device is relative to a vehicle for passive entry and passive start of the vehicle.

BACKGROUND

This section provides background information related to the present disclosure, which is not necessarily prior art.

In automotive security, systems are under development that allow authentication for access to and/or starting of a vehicle using a Bluetooth connection to a mobile device. Such systems generally require that a plurality of antennas be mounted on the vehicle in order to determine the mobile device's location relative to the vehicle. In some of the systems, one Bluetooth transceiver is connected to a plurality of antennas by way of a switch. Other systems include a plurality of Bluetooth transceivers, each with one antenna. While these systems may be suitable for their intended use, they have several disadvantages and are subject to improvement. For example, in systems with one Bluetooth transceiver connected to a plurality of antennas, inaccurate results are often produced because simultaneous measurements cannot be collected from each antenna, and the measurements are time dependent. Having one Bluetooth transceiver connected to multiple antennas also undesirably increases energy consumption in the mobile device because more communication packets are required to collect a single set of measurements (i.e., one measurement from each antenna). Connecting each of the plurality of antennas to a single Bluetooth transceiver requires a large amount of coaxial cable, which is expensive, thus making such systems further undesirable.

Systems that use a plurality of Bluetooth transceivers, each with one antenna, may produce more accurate results, but are more expensive to produce due to the use of additional antennas and transceivers. Further, when the transceivers are mounted outside of the vehicle, the inter-module communication (e.g., CAN, LIN, CXPI) of the vehicle is exposed to potential attacks from outside the vehicle. Current consumption is also increased in the vehicle due to the inclusion of multiple transceivers.

The present teachings provide for a mobile device location and authentication system that addresses the shortcomings of current systems, and provides numerous advantages as described herein and as one skilled in the art will appreciate.

SUMMARY

This section provides a general summary of the disclosure, and is not a comprehensive disclosure of its full scope or all of its features.

The present teachings provide for a system for identifying location of a mobile electronic device relative to an object. The system includes an electronic control unit configured to calculate location of the mobile electronic device, the electronic control unit including a first transceiver connected to a first antenna that receives signals from the mobile electronic device used by the electronic control unit to identify location of the mobile electronic device. One or more antenna modules are in communication with the electronic control unit. Each one of the antenna modules includes a second transceiver connected to at least two secondary antennas that receive signals from the mobile electronic device used by the electronic control unit to identify location of the mobile electronic device.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of select embodiments and not all possible implementations, and are not intended to limit the scope of the present disclosure.

Figure 2:
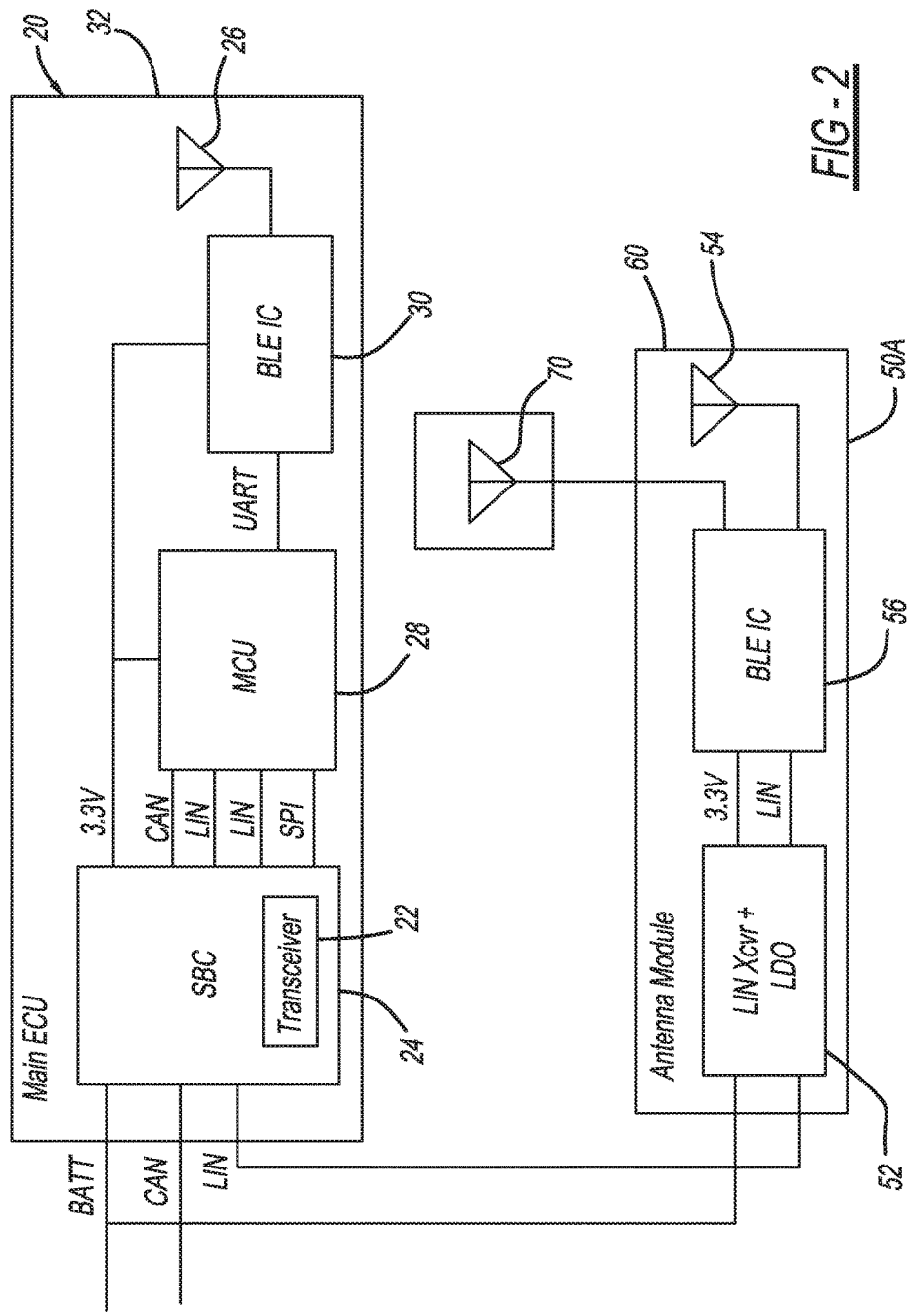

FIG. 1 illustrates a vehicle including a system according to the present teachings for identifying where a mobile electronic device is relative to the vehicle; and FIG. 2 illustrates additional features of the system according to the present teachings for identifying where the mobile electronic device is relative to the vehicle.

Corresponding reference numerals indicate corresponding parts throughout the several views of the drawings.

DETAILED DESCRIPTION

Example embodiments will now be described more fully with reference to the accompanying drawings.

FIG. 1 illustrates a system 10 according to the present teachings for identifying where a mobile electronic device 12 is relative to a vehicle 14. Although the mobile electronic device 12 is illustrated as a smart phone, the device 12 can be any mobile electronic device suitable for use as an electronic or virtual key for locking/unlocking the vehicle 14, starting a power plant of the vehicle 14, opening a tailgate or windows of the vehicle 14, etc. Although the vehicle 14 is illustrated as a passenger vehicle, the vehicle 14 can be any suitable vehicle, such as any suitable passenger vehicle, commercial vehicle, utility vehicle, construction vehicle, military vehicle, mass transit vehicle, aircraft, watercraft, etc. The system 10 can also be used with any suitable security system, such as any suitable building system, storage system, weapons system, etc.

The system 10 according to the present teachings provides numerous advantages over other systems. For example and as described herein, the system 10 according to the present teachings uses a reduced number of receivers/transceivers, and protects the system 10 from external attacks. The system 10 can be configured to operate by way of any suitable short-range wireless communications standard, such as Bluetooth.

With continued reference to FIG. 1, and additional reference to FIG. 2, the system 10 generally includes a main electronic control unit (ECU) 20, a first antenna module 50A, and a second antenna module 50B. The main ECU 20 can be mounted at any suitable position throughout the vehicle 14. For example, the main ECU 20 can be mounted at a general mid-point of the vehicle 14 at an elevated location, such as on an interior ceiling. The main ECU 20 can also be mounted on an A-pillar, B-pillar, C-pillar, etc. The first antenna module 50A can be mounted at a forward area of the vehicle 14, and the second antenna module 50B can be mounted at a rear area of the vehicle 14. The first and second antenna modules 50A and 50B are connected to the main ECU 20 in any suitable manner, such as by way of any suitable local interconnect network (LIN) connection (hardwire or wireless (e.g., Bluetooth)), and in any suitable manner to transfer power from the main ECU 20 to the first and second antenna modules 50A and 50B. The second antenna module 50B is optional, and thus the system 10 need only include the first antenna module 50A. The system 10 may also include more than just two antenna modules 50A and 50B. The system 10 may include any suitable number of antenna modules 50A/50B. Typically, the larger the vehicle the greater the number of antenna modules 50A/50B that will be included.

With particular reference to FIG. 2, additional details of the main ECU 20 will now be described. In this application, including the definitions herein, the terms "control unit," "controller," "module," and "unit," may each be replaced with the term "circuit." These terms may each refer to, be part of, or include processor hardware (shared, dedicated, or group) that executes code and memory hardware (shared, dedicated, or group) that stores code executed by the processor hardware. The code is configured to provide the features of the system 10 described herein.

The main ECU 20 includes a receiver or transceiver 22. The transceiver 22 may be included with a system basis chip (SBC) 24. The transceiver 22 is connected to an antenna (first antenna) 26 of the main ECU 20. The main ECU 20 further includes a micro control unit (MCU) 28 and a first Bluetooth low-energy integrated circuit (BLE IC) 30. Each one of the transceiver 22, SBC 24, first antenna 26, MCU 28, and BLE IC 30 may be provided in a common housing, such as main ECU housing 32.

The SBC 24 is in receipt of power from any suitable power source, such as a battery. The SBC 24 is connected to the MCU 28 and BLE IC 30 in any suitable manner in order to distribute power thereto, such as by way of any suitable 3.3 volt wired connection. The SBC 24 is also connected to any suitable vehicle bus, such as a controller area network (CAN) bus. The MCU 28 can be connected to the CAN bus by way of the SBC 24. The SBC 24 and the MCU 28 are also connected to one another by way of any suitable local interconnect network (LIN) connection, and any suitable serial peripheral interface bus (SPI). The MCU 28 and BLE IC 30 are connected by any suitable universal asynchronous receiver/transmitter (UART) connection. The first antenna 26 is connected to the BLE IC 30 in any suitable manner, such as with a coaxial connection.

The SBC 24 is configured to manage power and communications throughout the main ECU 20, as well as the system 10 generally. The MCU 28 is configured to interpret communications routed thereto, such as by the SBC 24, and communicate with other components and modules of the system 10 and the vehicle 14 generally, such as a pairing module for pairing the mobile electronic device 12 with the system 10. Based on the strength of the signal received from the mobile electronic device 12, as explained further herein, the MCU 28 is able to determine the location of the mobile electronic device 12. The BLE IC 30 is configured to communicate with the mobile electronic device 12 by way of the antenna 26. Although the BLE IC 30 is described as a Bluetooth integrated circuit, communication with the mobile electronic device 12 can take place by way of any other suitable low-energy communication protocol.

With particular reference to FIG. 2, additional details of the first antenna module 50A will be described. The second antenna module 50B is substantially similar to, or the same as, the first antenna module 50A, and thus the description of the first antenna module 50A is sufficient to also describe the second antenna module 50B. The description of the first antenna module 50A is also sufficient to describe any additional antenna modules that may be included in addition to the first and second antenna modules 50A and 50B.

The first antenna module 50A generally includes a local interconnect network transceiver (LIN Xcvr) and low-dropout regulator (LDO) 52. The transceiver 52 receives and transmits signals by way of (second) antenna 54. The antenna module 50A can be configured for communication by way of any suitable low-energy transmission protocol, such as Bluetooth. When configured for Bluetooth, the antenna module 50A includes a (second) Bluetooth low-energy integrated circuit (BLE IC) 56, which can be the same as or substantially similar to the BLE IC 30. Thus the description of the first BLE IC 30 also describes the second BLE IC 56. The first antenna module 50A can further include an antenna module housing 60, which can include each one of the LIN Xcvr+LDO 52, the second antenna 54, and the second BLE IC 56. The second antenna 54 may also be separate from the housing 60, and connected thereto in any suitable manner, such as with a coaxial connection.

The antenna module 50A is powered in any suitable manner, such as by a connection to the same source powering the main ECU 20. The antenna module 50A is connected to the main ECU 20 in any suitable manner, such as by way of any suitable local interconnect network connection between the SBC 24 and the LIN Xcvr+LDO 52. Power input to the LIN Xcvr+LDO 52 is input to the BLE IC 56 by way of any suitable connection, such as any suitable 3.3 volt wired connection between the LIN Xcvr+LDO 52 and the BLE IC 56. The LIN Xcvr+LDO 52 and the BLE IC 56 are connected in any suitable manner, such as with any suitable LIN connection. The second antenna 54 is connected to the BLE IC 56 with any suitable connection, such as by any suitable coaxial connection.

The system 10 further includes an external (or third) antenna 70. The external antenna 70 is spaced apart from the antenna module 50A, and can be mounted at any suitable position about the vehicle 14. For example, the external antenna 70 can be mounted inside or outside of the vehicle 14. The external antenna 70 may be mounted to the door handles of the vehicle 14, vehicle tailgate, vehicle fascia, seats, etc. Although only one external antenna 70 is illustrated in FIG. 2, the system 10 can include any suitable number of external antennas 70 mounted at any suitable positions about the vehicle 14. For example and as illustrated in FIG. 1, a first external antenna 70A can be arranged at the front bumper and connected to the first antenna module 50A, and a second external antenna 70B can be arranged at the rear bumper and connected to the second antenna module 50B. Each one of the external antennas 70 can be connected to the antenna module 50A in any suitable manner with any suitable connection, such as any suitable coaxial connection. The BLE IC 56 is connected to the antennas 54 and 70 (as well as to any additional external antennas 70) in any suitable manner, such as by way of a radio frequency (RF) switch. The RF switch may be integrated into the BLE IC 56 itself, for example.

When a mobile electronic device 12, which has been previously paired with the system 10, is within the range of the first antenna 26 and the second antenna 54 (as well as the optional external antenna(s) 70), the mobile electronic device 12 will be in communication with the main ECU 20, the first antenna module 50A, and any other antenna modules such as the second antenna module 50B. This communication with the device 12 can be by way of Bluetooth communication with the first antenna 26, the second antenna 54, the optional third antenna 70, and any other antennas that may be included with the system 10. The BLE IC's 30 and 56 monitor the connections with the mobile electronic device 12, and specifically the signal power of the connections. The measured signal strength between the first antenna 26 and the mobile electronic device 12 is sent from the BLE IC 30 to the MCU 28 by way of the UART connection. The measured signal strength between the second antenna 54 and the mobile electronic device 12, as well as between the third antenna 70 and the mobile electronic device 12, is sent from the BLE IC 56 to the MCU 28 by way of the LIN connection.

The MCU 28 is configured to compare the signal strength of each connection between the antennas 26, 54, and 70, as well as any other antennas included with the system 10, and the mobile electronic device 12. Based on the signal strengths, angles of arrival, times of flight, time-delays of arrival, etc., the MCU 28 is configured to identify the location of the mobile electronic device 12 relative to the antennas 26, 54, 70, etc., and accordingly relative to the vehicle 14 generally. The MCU 28 can be configured to determine the location of the mobile device 12 in any suitable manner, such as by triangulation, absolute value thresholds, differential thresholds, or any combination thereof.

The present teachings provide for numerous advantages over the art. For example, the system 10 advantageously reduces the overall length (and therefore cost) of coaxial cable needed when compared with systems having a single Bluetooth transceiver connected to a plurality of antennas by way of a switch. This is because each transceiver, such as the LIN Xcvr+LDO 52 may be mounted nearby one or more antennas associated therewith, such as the second antenna 54 and the (third) external antenna 70. The system 10 also protects from outside attacks (packing) because external antennas, such as the external antenna 70, may be used on an exterior of the vehicle 14 whenever necessary.

The system 10 is configured such that multiple Bluetooth packets are required to be exchanged with the mobile electronic device 12 to collect a single set of signal strength measurements. The number of packets is advantageously only equal to the number of antennas connected to each transceiver 22, 52 as opposed to the total number of antennas 26, 54, 70 as is the case with systems having a single Bluetooth transceiver connected to a plurality of antennas by way of a switch.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A system for identifying location of a mobile electronic device relative to an object, the system comprising:
    an electronic control unit configured to calculate location of the mobile electronic device, the electronic control unit including a first transceiver connected to a first antenna that receives signals from the mobile electronic device used by the electronic control unit to identify location of the mobile electronic device; and
    one or more antenna modules in communication with the electronic control unit, each one of the one or more antenna modules including a second transceiver connected to at least two secondary antennas that receive signals from the mobile electronic device used by the electronic control unit to identify location of the mobile electronic device;
    wherein the one or more antenna modules include a first antenna module and a second antenna module; and
    wherein the second antenna module is configured to be mounted to the object apart from the electronic control unit and the first antenna module, the second antenna module is in communication with the electronic control unit and includes a third transceiver and a secondary antenna connected thereto that receives signals from the mobile electronic device used by the electronic control unit to identify location of the mobile electronic device relative to the object based on strength of the signals.

2. The system of claim 1, wherein the object is a vehicle.

3. The system of claim 1, wherein the first transceiver and the second transceiver are Bluetooth transceivers.

4. The system of claim 1, wherein the first antenna is within a common housing with the first transceiver.

5. The system of claim 1, wherein one of the secondary antennas is within a common housing with the second transceiver.

6. The system of claim 1, wherein one of the secondary antennas is within a housing with the second transceiver, and another one of the secondary antennas is separate from the housing.

7. The system of claim 1, wherein at least two of the secondary antennas are spaced apart from the antenna module to which they are connected.

8. The system of claim 1, wherein at least one of the secondary antennas is connected to the antenna module with a cable.

9. The system of claim 8, wherein the cable is a coaxial cable.

10. The system of claim 8, wherein at least one of the secondary antennas is mounted at an exterior of a vehicle.

11. A system for identifying location of a mobile electronic device relative to a vehicle, the system comprising:
    an electronic control unit configured to be mounted within the vehicle to determine location of the mobile electronic device relative to the vehicle, the electronic control unit including a first receiver connected to a first antenna that receives signals from the mobile electronic device used by the electronic control unit to identify location of the mobile electronic device relative to the vehicle based on strength of the signals; and
    one or more antenna modules configured to be mounted within the vehicle apart from the electronic control unit, the one or more antenna modules are in communication with the electronic control unit, each one of the one or more antenna modules including a second receiver and at least two secondary antennas connected thereto that receive signals from the mobile electronic device used by the electronic control unit to identify location of the mobile electronic device relative to the vehicle based on strength of the signals;
    wherein the one or more antenna modules include a first antenna module and a second antenna module; and
    wherein the second antenna module is configured to be mounted within the vehicle apart from the electronic control unit and the first antenna module, the second antenna module is in communication with the electronic control unit and includes a third receiver and a secondary antenna connected thereto that receives signals from the mobile electronic device used by the electronic control unit to identify location of the mobile electronic device relative to the vehicle based on strength of the signals.

12. The system of claim 11, wherein at least one of the secondary antennas is spaced apart from the antenna module to which they are connected and mountable to the vehicle.

13. The system of claim 12, wherein the electronic control unit further includes:
    a system basis chip including the first receiver and configured to distribute power throughout the electronic control unit; and
    a micro control unit configured to identify location of the mobile electronic device based on signal strength information.

14. The system of claim 13, wherein the electronic control unit further includes a first bluetooth, low energy, integrated circuit configured to communicate with the mobile electronic device.

15. The system of claim 14, further comprising an electronic control unit housing including the system basis chip, the micro control unit, and the bluetooth, low energy, integrated circuit.

16. The system of claim 12, wherein the one or more antenna modules are connected to the electronic control unit with a local interconnect network bus; and
    wherein at least one of the secondary antennas is connected to one of the antenna modules with coaxial cable.

17. The system of claim 11, wherein the first receiver and the second receiver are Bluetooth receivers.

18. The system of claim 11, wherein the one or more antenna modules each further include a local interconnect network transceiver including the second receiver, and a second bluetooth, low energy, integrated circuit configured to communicate with the mobile electronic device by way of the second antenna.

19. The system of claim 18, wherein the local interconnect network transceiver and the second bluetooth, low energy, integrated circuit are within a common antenna module housing mounted within the vehicle spaced apart from an electronic control unit housing including the electronic control unit.

* * * * *

UNITED STATES PATENT AND TRADEMARK OFFICE
CERTIFICATE OF CORRECTION

PATENT NO. : 10,051,435 B2
APPLICATION NO. : 15/467482
DATED : August 14, 2018
INVENTOR(S) : Steven Sute Page 1 of 1

It is certified that error appears in the above-identified patent and that said Letters Patent is hereby corrected as shown below:

On the Title Page

Column 1, (71), Applicant, Line 1, After "Inc.", insert --, Southfield, MI (US); DENSO CORPORATION, Kariya, Aichi-pref. (JP)--

Signed and Sealed this
Twenty-first Day of May, 2019

Andrei Iancu
*Director of the United States Patent and Trademark Office*